United States Patent Office 3,011,326
Patented Dec. 5, 1961

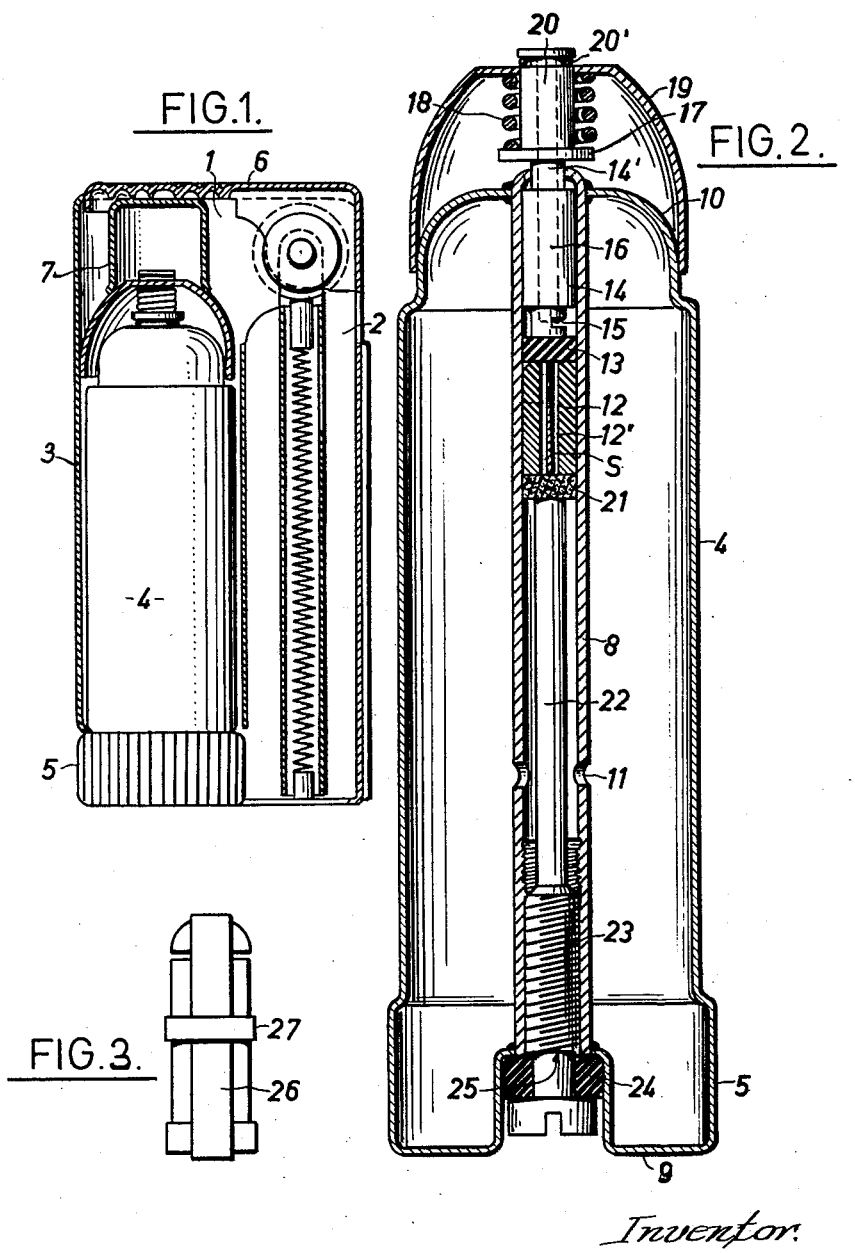

3,011,326
FUEL CARTRIDGE FOR A GAS CIGARETTE-LIGHTER
Alex Fellner, Zurich, Switzerland, assignor to Hermann Zahn, Frankfurt am Main, Germany
Filed Jan. 12, 1959, Ser. No. 786,378
Claims priority, application Austria Jan. 16, 1958
7 Claims. (Cl. 67—7.1)

The invention relates to a fuel cartridge for a gas cigarette-lighter. The cover of such a gas cigarette-lighter may extend over the gas outlet from the fuel cartridge, through which passes a tube which forms a gas passage communicating with the interior of the cartridge through an aperture. The lower end of the tube may be closed by a seal and the upper end by a valve stem. In valves of this general type, the valve stem normally closes the valve opening under the action of a spring and has to be lifted to a greater or lesser extent from its seating, by means of a lever, on actuation of the cigarette-lighter. If it does not light, the various levers associated with the valve have to be restored to their initial position.

The invention overcomes this disadvantage by providing a structure in which, on closure of the lighter cover, the valve stem, with the interposition of a spring, closes the valve, if desired with the aid of a hood covering the valve.

Preferably inserted with a press fit in the tube passing through the fuel cartridge is a valve body which is provided with at least one bore in the longitudinal axial direction, the upper end of which may be closed by a plug under the action of the valve stem. Furthermore, the lower end of the bore in the valve body may be provided with a plug which acts as a throttle and the action of which may be regulated by means of a pin inserted in the tube from below.

By means of this throttle it is possible to regulate the size of the flame to any desired extent, even when it is burning. In the intervals between operation, there accumulates in the bore in the valve body a quantity of gas which, at the moment of opening and lighting, provides a greater amount of gas and therefore a larger igniting flame than would correspond to the throttle setting. This phenomenon is desirable.

Nevertheless, should this gas-collecting chamber be too large, for example for technical manufacturing reasons, it may be reduced by inserting a preferably cylindrical pin in the bore in the valve body.

The invention will now be explained in more detail with reference to an embodiment illustrated in the drawing in which:

FIGURE 1 shows a cigarette lighter with a fuel cartridge according to the invention, inserted therein;

FIGURE 2 shows in section the fuel cartridge and valve of FIGURE 1, and

FIGURE 3 shows, on a smaller scale, the fuel cartridge ready for transport.

In the drawing, 1 represents the housing of the cigarette lighter, which is provided with an igniting mechanism on the one side 2 and frictionally holds the fuel cartridge 4 on the other side 3. In the present case, this portion of the housing is in the form of a cylinder which is open at the top and bottom. The fuel cartridge 4 is introduced into the cylinder from below leaving a milled extension 5 outside the cylinder. The frictional contact obtained is quite sufficient to hold the fuel cartridge 4 in the housing 1. At the upper end of the housing, a pivotally mounted cover 6 extends over both housing portions 2 and 3. It carries a cup-like cap 7 which, in ordinary petrol lighters, previously served, in the closed position, to seal off the fuel tank, with the wick, from the outside in order to prevent the escape of fuel vapours.

The fuel cartridge 4 (FIGURE 2) is illustrated as constructed as a hollow cylindrical body, through the length of which extends a tube 8, with the bottom 9 and cap 10 of the body being tightly soldered to the tube 8. Somewhat below the middle, the tube 8 is provided with a transverse bore 11. Inserted with a press fit in the upper portion of the tube 8 is a valve body 12 which is provided with a longitudinal axial bore 12'. While its lower end face extends perpendicular to its longitudinal axis, the upper end face is a tapered surface on which rests a plug 13 of rubber, polyvinyl chloride or the like. Inserted for easy axial movement in the uppermost portion of the tube 8 is a valve stem 14. It is drilled through its whole length or at least provided with a blind bore and is provided at its lower recessed end with a transverse bore or groove 15 which brings the bore 16 into communication with the interior of the tube 8. Substantially in the middle, at the point 14', the valve stem is provided with a neck-like portion of reduced diameter, and similarly formed at its lower end. The upper end of the tube 8 is tapered to facilitate upset thereof inwardly which serves to limit the movement of the valve stem. Above the recess 14', a plate-like shoulder 17 which forms an abutment for a helical spring 18 which in turn carries a cup like hood 19. A spring lock clip or ring 20' inserted in an annular groove 20 prevents the hood 19 from being lifted and detached under the action of the initially tensioned spring 18. The hood 19 extends at least partially over the closing cap 10 of the fuel cartridge 4, thus preventing the penetration of foreign bodies, such as particles of flint or the like, into the upper end of the tube 8, so that the mobility of the valve stem is not impaired.

Below the valve body 12 there is provided a plug 21 of wadding, felt or the like, which is urged by a pin 22 with a certain pressure against the bore of the valve body 12. The pin 22 has a threaded extension 23 with which it is screwed into the tube 8. Towards the bottom, the pin 22 is recessed and carries a packing ring 24 which is urged against the end 25 of the tube by means of a cylindrical screw head arranged in a countersunk portion of the bottom 9 of the housing. This construction thus permits the satisfactory sealing of the tube 8 at the bottom, and as a result of the thread 23, the pin 22 may be turned to create any desired pressure of the plug 21 against the lower surface of the valve body 12. Thus the pin 22 and the plug 21 act as an adjustable throttle by means of which the size of the flame may be adjusted. The pin 22 can easily be adjusted, for example by means of a coin, although it is also possible to provide a knurled disc or the like at the bottom as a handle to which the pin 22 may be connected and so easily turned and adjusted. The throttle pin 22 may be produced from a material, the coefficient of thermal expansion of which is greater than that of the tube 8, as a result of which, automatic regulation of the throttle becomes possible on variation in the temperature and hence on variation in the gas pressure in the fuel cartridge, in order to obtain a constant size of flame. This simple regulating device is rendered possible as a result of the fact that the valve device extends over the whole height of the fuel cartridge, enabling the use of simple, elongated components.

When the cigarette lighter is in closed position, the cap 7 of the cover 6 presses against the hood 19 and the latter resiliently on the valve stem 14. This closes the outlet of the valve body 12 by means of the plug 13. If the cigarette lighter is actuated, the valve stem 14 can lift under the pressure of the gas which gas can flow upwards in accordance with the setting of the throttle 21, 22.

Inserted in the bore 12' of the valve body 12 is a pin S having a diameter which is smaller than that of the bore 12'. The remaining cross-sectional area is sufficient to allow the passage of a sufficient amount of gas to form any desired flame within the throttle range corresponding to the particular pressure in the cartridge. It is obvious that the cross-section of the inserted pin may be of any desired shape, for example polygonal and that it is not necessary for the pin to assume a specific position in the bore.

When the valve 13, 14 is closed, only a small amount of gas collects in the interior of the valve body, but it gradually assumes the pressure of the gas in the cartridge 4. On ignition, this amount is discharged upwards through the valve and the pressure drops rapidly to the extent set by the throttle 21, 22. The briefly increased amount of gas which has emerged is used up immediately on ignition without an undesirably larger flame being formed.

After filling, the valve of the fuel cartridge is held closed by means of a resilient band 26 of rubber or synthetic material and is put on the market in this condition. This band surrounds the fuel cartridge in a longitudinal plane thereof (FIGURE 3), and exerts pressure on the cap 19 so that the valve is held closed, with the upper end of the valve positioned in a hole in the band 26. In order to prevent the band 26 from slipping off the cartridge, it is held in a transverse plane by a further band 27.

Changes may be made within the scope and spirit of the appended claims which define what is believed to be new and desired to have protected by Letters Patent.

I claim:

1. In a fuel cartridge for gas cigarette lighters, the combination of a cartridge body having top and bottom walls and side wall means therebetween, a tubular member extending through the body with its respective ends secured in fluid tight relation to the top and bottom walls, means operatively closing the lower end of said member, a valve body positioned in said tubular member intermediate its ends in fluid-tight engagement therewith, said tubular member having a transverse passageway therein operatively connecting the interior of the cartridge body and that of the tubular member below said valve body, valve means including a valve stem cooperable with said valve body operative, upon inward movement toward the latter, to operatively close the upper portion of said tubular member, an actuating member carried by said valve stem, and spring means operatively connecting said actuating member and said valve stem operative to transmit a closing movement to the latter when said actuating member is moved in the corresponding direction.

2. A fuel cartridge as defined in claim 1, wherein said actuating member is in the form of a cup-shaped hood operative to cover the upper end of said cartridge.

3. A fuel cartridge as defined in claim 1, wherein said valve body is secured in said tubular member by a press fit and is provided with an axially extending bore therein, the upper end of which is provided with a closure plug actuatable to closed position by said valve stem, and the lower end of which is provided with a plug constructed to partially close said lower end, and a pin adjustably positioned in the lower end of the tubular member operatively engageable with said second-mentioned plug for adjusting the action of such plug to regulate the flow of gas through said valve body, in the manner of a throttle.

4. A fuel cartridge as defined in claim 3, wherein said throttle pin is formed as an extension of the closure means for the adjacent end of said tubular member.

5. A fuel cartridge for a gas cigarette-lighter as claimed in claim 4, characterised in that the throttle pin consists of a material, the thermal expansion of which is greater than that of the tubular member thus permitting automatic regulation of the throttle in varying temperature conditions.

6. A fuel cartridge for a gas cigarette-lighter as claimed in claim 3, characterised in that the throttle pin is provided with a thread and is thus adjustable in the tubular member, and is connected, below the bottom of the cartridge, with a head which serves as a handle for turning the throttle pin.

7. A fuel cartridge for a gas cigarette-lighter as claimed in claim 6, characterised in that a pin is inserted in the longitudinal bore in the valve body thus reducing the volume of the bore.

References Cited in the file of this patent

UNITED STATES PATENTS 2,836,044    Zellweger _____ May 27, 1958

FOREIGN PATENTS 1,137,036    France _____ Jan. 7, 1957
1,151,791    France _____ Aug. 26, 1957